United States Patent
Pfarr et al.

(10) Patent No.: US 9,983,572 B2
(45) Date of Patent: May 29, 2018

(54) OPTIMIZATION OF BLADE PORTIONER CUTTING SPEED

(71) Applicant: John Bean Technologies Corporation, Chicago, IL (US)

(72) Inventors: Craig E. Pfarr, Issaquah, WA (US); George R. Blaine, Lake Stevens, WA (US)

(73) Assignee: John Bean Technologies Corporation, Chicago, IL (US)

( * ) Notice: Subject to any disclaimer, the term of this patent is extended or adjusted under 35 U.S.C. 154(b) by 251 days.

(21) Appl. No.: 15/004,907

(22) Filed: Jan. 23, 2016

(65) Prior Publication Data
US 2017/0212506 A1 Jul. 27, 2017

(51) Int. Cl.
*G05B 19/416* (2006.01)
*B26D 5/00* (2006.01)

(52) U.S. Cl.
CPC ......... *G05B 19/4166* (2013.01); *B26D 5/007* (2013.01); *G05B 2219/37336* (2013.01); *G05B 2219/49077* (2013.01)

(58) Field of Classification Search
CPC ...... G05B 19/4166; G05B 2219/49077; G05B 2219/37336; B26D 5/007
See application file for complete search history.

(56) References Cited

U.S. PATENT DOCUMENTS

| | | | |
|---|---|---|---|
| 4,031,368 A | * | 6/1977 | Colding ............. G05B 19/4163 356/447 |
| 4,707,793 A | | 11/1987 | Anderson |
| 4,941,375 A | * | 7/1990 | Kasper .................... B26D 5/20 83/23 |

(Continued)

FOREIGN PATENT DOCUMENTS

| | | |
|---|---|---|
| EP | 2 030 744 A1 | 4/2009 |
| EP | 2 572 840 A2 | 3/2013 |

(Continued)

OTHER PUBLICATIONS

International Search Report and Written Opinion dated May 9, 2017, issued in corresponding International Application No. PCT/US2017/014601, filed Jan. 23, 2017, 26 pages.

(Continued)

*Primary Examiner* — Ramesh Patel
(74) *Attorney, Agent, or Firm* — Christensen O'Connor Johnson Kindness PLLC (57) ABSTRACT

A method and system (10) are provided for automatically portioning workpieces (14) using a rotating blade (22) passing through narrow gap (20) formed between the ends of adjacent conveyors (12) and (18). A scanning system (16) scans the workpieces (14) to physically characterize the workpieces and control the operation of the blade (22), including its rotational speed. The portioning of the workpiece can be carried out in accordance with one or more directly-controlled characteristics (parameter/specifications), such as a cutting path of the blade (22), the rotational speed of the blade (22), and the speed of the conveyor (12). The directly-controlled characteristics may be varied until an acceptable set of one or more indirectly-controlled characteristics is achieved, including, for example, the weight of the cut portions, the quality of the cuts achieved by the cutting blade, and the throughput of the portioning system (10).

19 Claims, 6 Drawing Sheets

(56) References Cited

U.S. PATENT DOCUMENTS

| | | | | |
|---|---|---|---|---|
| 6,640,681 | B1* | 11/2003 | Weber | B26D 7/18 |
| | | | | 209/918 |
| 7,153,203 | B2* | 12/2006 | Pfarr | B23K 26/0838 |
| | | | | 452/150 |
| 7,373,217 | B2* | 5/2008 | Young | A22C 17/0033 |
| | | | | 700/127 |
| 8,688,267 | B2* | 4/2014 | Blaine | B07C 5/342 |
| | | | | 356/606 |
| 9,008,824 | B1* | 4/2015 | Blaine | B26D 5/00 |
| | | | | 700/103 |
| 9,098,081 | B2* | 8/2015 | Fromentin | G05B 19/401 |
| 9,285,213 | B2* | 3/2016 | Lindee | A22C 17/0033 |
| 9,486,008 | B2* | 11/2016 | Pryor | A23N 15/003 |
| 2005/0000344 | A1 | 1/2005 | Bucks | |
| 2013/0074667 | A1* | 3/2013 | Weber | B25J 9/0051 |
| | | | | 83/73 |
| 2014/0165803 | A1* | 6/2014 | Kuhmichel | B26D 5/00 |
| | | | | 83/13 |

FOREIGN PATENT DOCUMENTS

| | | |
|---|---|---|
| EP | 2 759 205 A1 | 7/2014 |
| EP | 2 878 203 A1 | 6/2015 |
| GB | 2 173 008 A | 10/1986 |
| GB | 2 239 787 A | 7/1991 |
| GB | 2 377 362 A2 | 1/2003 |
| WO | 2016/083621 A1 | 6/2016 |

OTHER PUBLICATIONS

Chaudhury, M.K., "Viewpoint: A Cut Above the Rest," APS Physics 5(139):1-5, Dec. 2012.

Reyssat, E., et al., "Slicing Softly With Shear," Physical Review Letters 109(24):244301: 1-5, Dec. 2012.

Smits, A.J., "Drag of Blunt Bodies and Streamlined Bodies," Feb. 1997, <https://www.princeton.edu/~asmits/Bicycle_web/blunt.html> [retrieved Jan. 8, 2016], 4 pages.

* cited by examiner

OPTIMIZATION OF BLADE PORTIONER CUTTING SPEED

TECHNICAL FIELD

The present invention relates to processing workpieces, and more particularly to portioning workpieces, such as food products, into smaller units.

BACKGROUND

Workpieces, including food products, are portioned or otherwise cut into smaller units or portions in accordance with customer needs. Food products are commonly portioned either to uniform or specific sizes, weights, thicknesses, or other specifications. Examples of commonly portioned food products include steaks to be served in restaurants, chicken filets packaged in frozen dinners and chicken patties sized and shaped to fit within a specific bun. Fish is likewise routinely portioned into filets or steaks.

Much of the portioning of workpieces, and in particular food products, is now carried out with the use of high-speed portioning machines. These machines use various scanning techniques to ascertain the size, shape, and other physical characteristics of the workpiece as it is being advanced on a moving conveyor. This information is analyzed with the aid of a computer to determine how to most efficiently portion the workpiece into optimum or desired sizes, weights, thicknesses, or other criteria being used. For example, the customer may desire chicken breast portions in two different weights or sizes. The chicken breast is scanned as it moves on an infeed conveyor belt, and a determination is made through the use of the computer as to how best to portion the chicken breast to the specific weights desired by the customer.

Portioning of workpieces can be performed by a cutting blade that swings across the conveyor system through a gap defined by the ends of two adjacent conveyors that advance and support the workpieces being portioned. Typically, the blade is attached to a servo motor, which spins the blade very quickly through the gap. The workpiece progresses forwardly on the conveyor belts across the gap, thereby advancing between successive blade revolutions. The blade may make approximately 20 to 30 cuts per second to provide controlled weight, thickness, or size portions, and the timing of the blade passage through the conveyor belt gap must be very tightly controlled.

As discussed below, it is important to optimize the speed of the rotating blade cutter to achieve clean and accurate cuts of the workpieces while also maximizing throughput and minimizing heat generation in the servo motor. The present disclosure addresses methods and systems for optimizing the rotational speed of the portioning blade.

SUMMARY

This summary is provided to introduce a selection of concepts in simplified form that are further described below in the Detailed Description. This summary is not intended to identify key features of the claimed subject matter, nor is it intended to be used as an aid in determining the scope of the claimed subject matter.

A method for determining optimized parameters for cutting a workpiece with a blade cutter rotated by a motor, the method includes monitoring the rotational speed of the blade cutter about the revolution of the blade cutter as driven by the motor, monitoring data from the motor corresponding to the operational parameters of the motor during rotation of the rotary blade, monitoring the accuracy of the desired physical specifications of the portions being cut, and monitoring the rate that the workpieces are fed to the cutting blade. During such monitoring, optimizing at least one of (1) the speed profile of the cutting blade during a revolution of the cutting blade and (2) the feed rate of the workpieces, based on one or more desired operational parameters of the motor, and the desired accuracy of one or more physical specifications of the portions being cut.

As a further aspect of the method, the operational parameters of the motor include the motor current usage profile, the temperature of the motor, the motor following error, and/or the motor torque profile.

As a further aspect of the method, the physical specifications of the portions being cut include the weight of the portions cut from the workpiece, the mass of the portions cut from the workpiece, the thickness of the portions cut from the workpiece, and the quality of the cuts made on the portions.

In accordance with a further aspect of the method, the quality of the cuts made on the portions can be quantified in accordance with the numerical scale.

As a further aspect of the method, the throughput of the workpieces is monitored and the speed profile of the cutter blade and/or the feed rate of the workpieces is optimized based on the desired operational parameters of the motor and the desired accuracy of the physical specifications of the portions being cut.

In a system for cutting food items into portions with a cutting blade rotated by a motor, a method is provided for adjusting the operational parameters of the system, which includes the rotational profile of the cutting blade and/or the feed rate of the food items relative to the cutting blade based on one or more desired physical characteristics of the portions being cut and the desired throughput of the food items to be achieved. The desired operational parameters of the system include determining an initial set of operational system parameters, including the rotational speed profile of the cutting blade and the feed rate of food items toward the cutting blade, monitoring the operational parameters of the motor during rotation of the cutting blade, monitoring the physical characteristics of the portions being cut, monitoring the throughput of the food items, and adjusting the rotational speed of the cutting blade and/or the feed rate of the food items based on at least one of the monitored parameters of the motor, the physical accuracy of the portions being cut, and the feed rate of the food items.

In the method of adjusting the operational parameters of the system, the physical characteristics of the portions being cut include weight, mass, thickness, area, and cut quality.

In the method for adjusting the operational parameters of the system, the operational parameters of the motor include current profile, torque profile, and motor following error.

In a further aspect of the adjustment method, the motor rotational profiles are selected from the group consisting of:

stopping the rotation of the cutting blade between each cut made and then accelerating the cut at the required time to make the next cut;

overshooting the normal rotational stop point of the cutting blade and retracting the cutting blade to rotational position before the stop point at a time before the next cut is required to be made;

rotating the cutting blade at a substantially constant speed;

rotating the cutting blade at an overspeed through the non-cutting rotational travel of the cutting blade and slowing the rotation of the cutting blade as the cutting blade cuts through the workpiece;

rotating the cutting blade at a substantially constant speed through the workpiece; and rotating the cutting blade at a non-constant speed through the workpiece.

A method for adaptive control of the operational parameters of a blade slicing machine to slice workpieces into portions with a blade rotated by a motor includes selecting a first set of cutting parameters, performing the slicing of the workpieces using the first set of selected cutting parameters, during the slicing of the workpiece measuring the operational parameters of the motor, varying at least one of the cutting parameters and comparing successive measurements of the operational parameters of the motor, determining the throughput at the selected operational parameters, and setting the cutting parameters of the slicing machine based on the measured operational parameters of the motor and the desired throughput.

In a further aspect of the present disclosure, the cutting parameters include the rotational speed of the blade and the feed rate of the workpieces.

In accordance with a further aspect of the present disclosure, the cutting parameters include at least one physical specification of the portions cut from the workpiece and the quality of the cuts made to the workpiece.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order to not unnecessarily obscure various aspects of the present disclosure. Further, it will be appreciated that embodiments of the present disclosure may employ any combination of features described herein and process steps may be performed in sequences other than as specified.

The present application may include references to directions such as "forward," "rearward," "front," "back," "upward," "downward," "right hand," "left hand," "in," "out," "extended," "advanced," "retracted," "proximal," and "distal." These references and other similar references in the present application are only to assist in helping describe and understand the present invention and are not intended to limit the present invention to these directions.

With respect to the terminology used in the present application, for the most part, the word "parameter" is used to refer to a physical characteristic or feature such as length, width, thickness, weight or color. Also for the most part, the word "specification" refers to a particular parameter value or range, such as a length of between 110 and 120 mm, a weight that is no more than 30 grams, or the color blue. Also, in accordance with the present application, a specific instance of a parameter will have a value, the value may or may not lie within a particular specification. In spite of the foregoing, it is within the scope of the present application to intermingle the use of the term parameter with the use of the term specification. For example, if the word specification is being utilized, this word should be interpreted broadly enough to also encompass the word parameter, and vice-versa. Also, in the present application, the word "characteristic" shall be a generic term that refers to "parameter" and/or "specification."

The present application may include modifiers, such as the words "generally," "approximately" or "substantially." These terms are meant to serve as modifiers to indicate that the "dimension," "shape," or other physical parameter or specification in question need not be exact, but may vary as long as the function that is required to be performed can be carried out. For example, in the phrase "generally circular in shape," the shape need not be exactly circular as long as the required function of the structure or process in question can be carried out.

In the following description, various embodiments of the present disclosure are described and illustrated. The systems, assemblies, apparatus and steps described and illustrated may be identified in the various embodiments by the same part number, but with an alpha suffix or other suffix. The descriptions of the parts/component steps of such systems, assemblies, apparatus, and methods that are the same or similar are not repeated so as to avoid redundancy in the present application.

Figure 1:
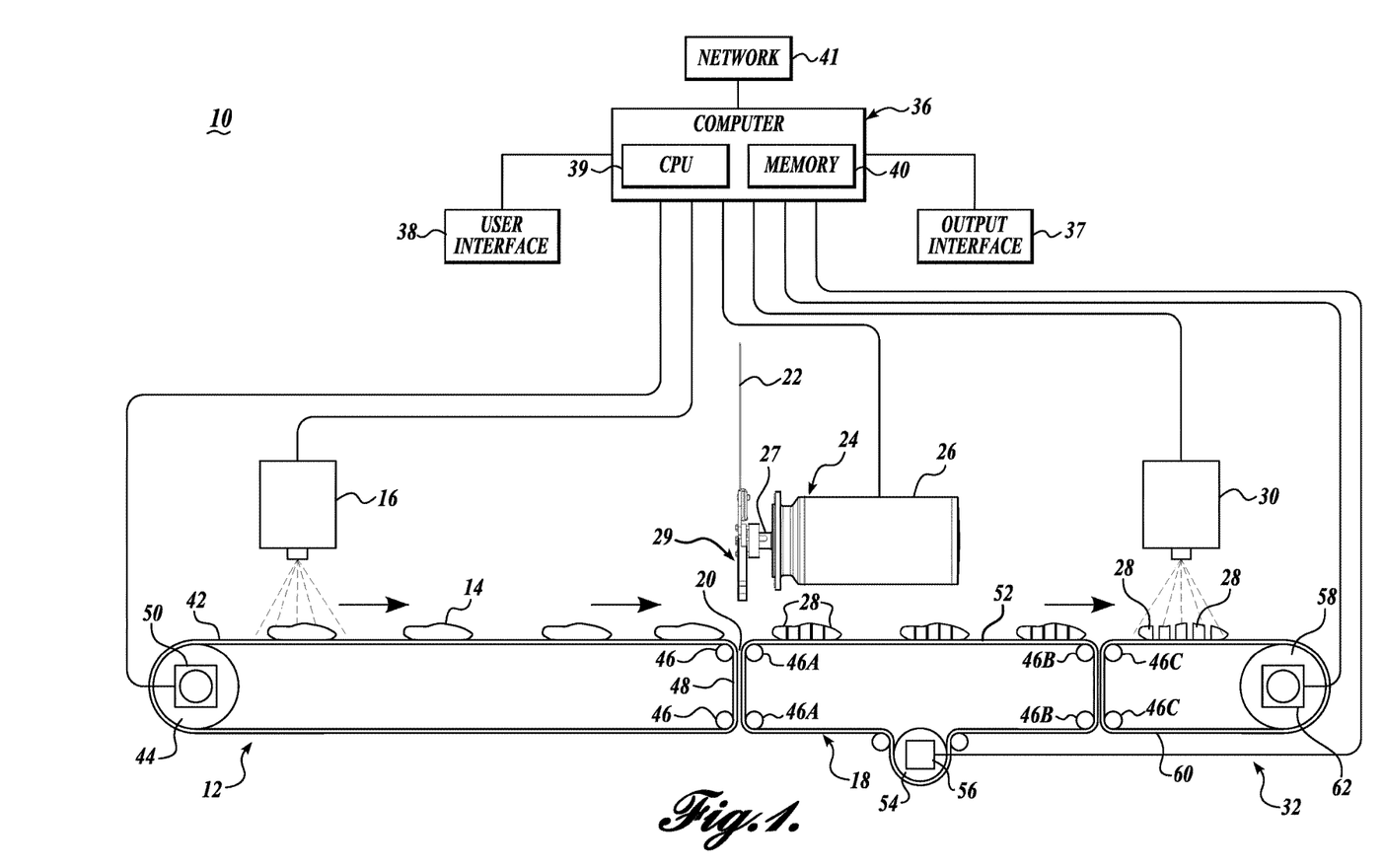
FIG. 1 is a schematic view of a disclosed embodiment of the present disclosure.

FIG. 1 schematically illustrates a portioning system 10 suitable for implementing an embodiment for the present disclosure. The portioning system 10 includes a first conveyor 12 for carrying workpieces (also "work products" or "products") 14 to be portioned past a first scanning system 16 for scanning the workpieces prior to portioning. A second conveyor 18 is positioned closely adjacent the end of the first conveyor 12, thereby to define a narrow gap 20 therebetween. A cutting knife or blade 22 (also "blade cutter" or "cutter") of a cutting device 24 (also "cutter") is rotated through the gap 20. The cutting device 24 includes a servo motor 26 for powering the blade 22 to cut the workpieces 14 into desired units or portions 28. The blade 22 is mounted on the drive shaft 27 of the servo motor 26 with a mounting assembly 29.

An optional second scanning system 30 may be positioned downstream of the cutting device 24 to scan and physically characterize the portions 28 as well as the nature, including the quality, of the cuts of the workpiece 14 performed by the cutting device 24. A third conveyor 32, operating at a higher speed than the second conveyor 18, receives the cut portions 28 from the second conveyor. The higher speed of the third conveyor 32 causes the portions to be separated so that the individual portions 28 can be analyzed as well as the cuts made on the portions. The speed of the third conveyor 32 is monitored via encoder 62 associated with drive roller 58 for the third conveyor, and is connected to a computer 36.

The conveyors 12, 18 and 32, the scanning systems 16 and 30, and the cutting device 24 are coupled to and controlled by the computer 36 (also "processor"). The computer may include an output interface or display 37, as well as a user input interface 38 (keyboard, mouse, etc.), a CPU 39, memory units 40, and other components that are commonly included in or used with computers. The computer can be connected to a network 41. Also, rather than employing a computer 36 specifically for portioning system 10, a network computing system can be used for this purpose instead.

Generally, the scanning systems 16 and 30 scan the workpieces 14 and portions 28 to produce scanning information representative of the physical characteristics of the workpieces/portions and to forward the scanning information to computer 36. The computer 36 analyzes the scanning data to develop the physical characteristics or parameters of the workpieces/portions, for example, their size, shape, length, width, thickness, etc. The computer 36 also develops a thickness or height distribution of the scanned workpiece/portion as well as area and/or volume distributions of the workpieces/portions. The weight of the workpiece/portions can be determined by using an assumed density for the workpieces/portions.

The computer can model the workpiece 14 to determine how the workpiece might be portioned into end product sets composed of one or more portions of specific physical criteria, including, for example, weight, shape, thickness, length, width, etc. In this regard, the computer is able to factor in defects found in the workpiece during the scanning process. Such defects may include local discontinuities (including voids), foreign material and undesirable material in the workpiece, for example, bones, gristle, or fat in meat products. With all of these criteria and factors in mind, the computer determines how the workpiece may be portioned into one or more end product sets. The computer then controls the cutting device 24 as well as the speeds of the conveyors 12 and 18 to portion the workpiece according to selected end product or portion sets.

The second scanner 30 may be used in a manner similar to scanner 16 in terms of characterizing the portions 28 resulting from workpiece 14. In addition, the scanner 30 is capable of analyzing the quality of the cuts made by the blade 22, including, for example, whether the portions 28 have been completely cut, and whether the cut of the portions is complete, ragged or uneven, straight or planar.

Describing the foregoing systems in more detail, the conveyor 12 carries the workpiece 14 beneath scanning system 16. The scanning system 16 may be of a variety of different types, including a video camera to view workpiece 14 illuminated by one or more light sources such as a laser. Light from the light source is extended across the moving conveyor belt 42 to define a sharp shadow or light stripe line, with the area forwardly of the transverse light beam being dark. When no workpiece 14 is being carried by the infeed conveyor 12, the shadow line/light stripe forms a straight line across the conveyor belt 42. However, when a workpiece 14 passes across the shadow line/light stripe, the upper, irregular surface of the workpiece produces an irregular shadow line/light stripe as viewed by a video camera directed diagonally and downwardly on the workpiece and the shadow line/light stripe. The video camera detects the displacement of the shadow line/light stripe from the position it would occupy if no workpiece were present on the conveyor belt. This displacement represents the thickness of the workpiece along the shadow line/light stripe. The length of the workpiece is determined by the distance of the belt travel that the shadow line/light stripes are created by the workpiece. In this regard, an encoder 50 is integrated into the infeed conveyor 12, with the encoder generating pulses at fixed distance intervals corresponding to the forward movement of the conveyor.

In lieu of a video camera, the scanning station may instead utilize an x-ray apparatus for determining the physical characteristics of the workpiece including its shape, mass, and weight. X-rays may be passed through the workpiece in the direction of an x-ray detector (not shown). Such x-rays are attenuated by the workpiece in proportion to the mass thereof. Scanner system 16 includes a generator to irradiate the workpiece 14 to be scanned with x-ray radiation and a receiver to receive the attenuated radiation. The receiver portion can be integral with the generator.

Attenuation of the x-rays can occur by passing through the workpiece or by reflection from the workpiece. When radiation passes through the workpiece, a certain amount of radiation is absorbed by the workpiece through which it passes. Therefore there will be a relationship between the amount of radiation sent to the workpiece and the amount of radiation received after passing through the workpiece. The cause of absorption is believed to reside in the chemical bonds within the molecules of the workpiece. Radiation once attenuated can be collected and converted into a useable form. Photodiodes, for example, may be used to convert an amount of radiation in the visible range into a voltage or current signal. For x-rays, a scintillating material may be used to generate visible light capable of detection by a photodiode. This method is described in U.S. Pat. No. 5,585,603, to Vogeley, Jr., which is herein incorporated by reference.

The foregoing scanning systems are known in the art and, thus, are not novel per se. However, the use of these scanning systems in conjunction with the other aspects of the described embodiments are believed to be new.

As noted above, the data and information measured/gathered by the scanning device(s) is transmitted to the computer 36, which records the location of the workpiece 14 on the conveyor 12, as well as the length, width and thickness of the workpiece about the entire area of the workpiece. With this information, the processor can develop an area profile, a volume profile and/or a height profile of the workpiece. Knowing the density of the workpiece, the processor can also determine the weight of the workpiece or segments thereof or profile thereof.

The scanning information can also be used to ascertain whether there are any defects in the workpiece. Such defects might include tears, holes, fat, bone, or cartilage. For example, if an x-ray apparatus is utilized, and if a hole or tear exists, the x-rays will be attenuated to a lesser extent than if the workpiece is structurally intact. Also, for a workpiece composed of raw meat, the density of fat, bones, and cartilage is different from the density of the meat. This density variation results in a difference in the attenuation of the x-rays passing through the workpiece. For example, the density of bone is greater than the density of meat. Thus, the x-rays passing through the bone will be attenuated to a greater extent than the x-rays passing through the meat. As a consequence, by the scanning process, the existence as well as the position and size of the defects in the workpiece may be ascertained. Examples of the foregoing scanning devices are disclosed in U.S. Pat. No. 6,563,904, incorporated by reference herein.

Preferably the computer 36, as noted above, having a CPU 39 and a memory 40, is used in the methods according to the present disclosure. Data consisting of desired end product specifications or attributes, such as weight, thickness, length, and height, are stored in the computer memory 40. The memory can store additional specifications, attributes, and/or maps that can readily be selected by a user via a user interface 38, for example, when changing product lines. For instance, the user may be processing chicken breasts for a particular customer who may have one or two desired weights for cut portions; when the order of the customer is filled, the user may switch the computer to meet the specifications of a different customer or to a different type of product. This switch may be automated and triggered by a counter that keeps track of the number of workpieces that have been processed, or the switch may be carried out manually to allow the user time to retool any apparatus or to recalibrate a process. In other alternate embodiments, a library of maps for an entire production plan can be stored in the memory of the computer 36.

As shown in FIG. 1, the computer 36 can be in communication with a network system 41 which allows the computer 36 to talk to and share information with other computers. Computer 36 can also drive other periphery hardware besides the scanner system 16. For instance, computer 36 can direct the operation of the conveyor 12, cutting device 24, and optional second scanner 30.

As noted above, workpieces 14 are cut or sliced into portions 28 of desired sizes, weights, thicknesses, etc., by use of a cutting device 24 that is rapidly rotated through a gap 20 between adjacent conveyors 12 and 18 by a servo motor 28. The rotational speed profile of the blade 22 is of importance with respect to numerous aspects of the operation of the system 10 including the quality of the cut made through the workpiece 14, the accuracy of the weights or other criteria of the portions 28, the throughput achieved by the system 10, and the operational parameters of the servo motor 28, including the level of motor heating, as discussed below.

What is meant by rotational speed profile is the rotational speed of the cutting blade about a full rotation of the blade, including when cutting through a workpiece and when rotating between cuts of the workpiece. The servo motor 24 rotates the cutting blade 22 at a very high speed, for example, at a rate of between 20 to 30 rotations per second.

As discussed more fully below, different blade rotational movement strategies can be utilized in the rotational profile of the blade 22.

The speed of the blade 22 can have a significant impact on various aspects of the portioning of workpieces 14, for example, meat workpieces. For workpieces composed of raw, unfrozen meat, it is desirable to cut the meat quickly to maximize throughput, but also the speed of the blade should be optimized for the quality of the cut achieved. To the cutting blade 22, the raw, unfrozen meat is quite soft. As a result, as it is being cut, the meat can provide a resistance to the movement or inertia of the blade that is almost like a liquid.

In cutting the meat, the blade initially compresses and deforms the meat (fibers) until the fibers fracture below the blade. The fracture then spreads through the meat below the blade as the blade cuts through the meat. If there is little or no support to the meat to counter the compression of the blade, the meat will not fracture readily but simply continue to compress and move with the blade. Thus, it is important that the gap 20 be as small as possible. Nonetheless, if the cutting of the meat occurs with too slow of a blade speed, the meat will tend to be pushed into the gap 20 without being cleanly cut, causing not only a low quality cut, as discussed below, but also variability in the weights or other physical specification for the portions 26.

On the other hand, cutting the meat at too high of a velocity of the blade 22 also leads to negative effects. The blade moving through the meat encounters two types of resistance, pressure drag and frictional drag. The pressure drag corresponds to a bluff body passing through a fluid, in this case, the knife blade 22 passing through the meat. In fluid dynamics, the pressure drag results from the eddy motions that are set up in the fluid by passage of the body. This drag is associated with the formation of the wake, for example, such as can be readily seen behind a passing boat. A similar phenomenon occurs when slicing meat. Even though blade 22 can be quite streamlined and is of limited cross-section, the pressure drag can be significant because pressure drag resistance roughly increases with the square of the velocity of the blade traveling through the meat.

The frictional drag is caused by friction between the sides of the knife blade 22 and the meat. For fluids like water, frictional drag increases linearly with velocity. However, the frictional drag of a body rubbing against a solid object is ideally independent of velocity. since meat usually behaves somewhere between a fluid like water and a solid, the frictional drag imposed on blade 22 by the meat being sliced increases with velocity but not quite in proportion with velocity. The net effect of the pressure drag and frictional drag caused by the meat is that the drag forces on blade 22 increase with velocity, and as such at some point the benefits gained by increasing the speed of the blade to increase throughput is offset by the drag forces imposed on the knife blade 22 by the meat being cut. It would be desirable to optimize the speed of the knife blade to achieve high throughput while at the same time managing or limiting the level of drag force on the knife blade.

Other factors in optimizing the rotational speed profile of the knife blade are discussed below. In this regard, for workpieces in the form of raw meat, cut accuracy and cut quality can be negatively impacted if the speed of the knife blade is too fast in relation to the drag force caused on the knife blade by the meat. During the initial stages of cutting, the meat is actually compressed by the blade 22 and the meat is deformed at a rate dependent on the speed of the blade. From testing using high speed cameras, it appears that the compression forces caused by the knife blade propagate through the meat, with the rate of propagation depending on characteristics of the meat, including its density. Nonetheless, if the blade moves too fast, the energy from the compressive forces propagates through the meat like a shockwave, which can cause the meat to move significantly on the conveyor. If this happens, the subsequent cuts made in the workpiece will be inaccurately placed.

Further, some gel like products, including some foods being portioned, can be compressed to the point that it becomes inelastic or "stiffens" with compression from high speed cutting, and can actually break a cutting blade 22. At a proper cutting blade speed, the meat compresses to the point of fracturing so that the force created by the blade propagates in meat in directions away from the compression at a speed fast enough to prevent the meat from becoming incompressible but slow enough so as not to create a shockwave that causes the meat to move. Applicants have found that there is an optimum blade speed or speed range resulting in accurate, high quality cuts for a given meat geometry for specific physical properties of the meat while maintaining a high level of throughput.

Bearing in mind that the blade compresses the meat until the meat fractures the geometry and specific physical properties of the meat workpiece, as such the width of the meat determines the length along the blade where compression is occurring and where, after failure, friction affects both the movement of the blade and the cutting of the meat. In a similar way, the thickness of the meat affects the compressibility of the meat as well as the amount of force required to cut through the meat to overcome frictional forces once failure (fracturing of the meat) has occurred. Physical properties of the meat include the compressibility of the meat, the internal forces "binding the meat" (between fibers and inside fibers), and also resisting fracturing of the meat. The difference in force required to cut the meat, and the reaction of the meat to the force of the blade, is different if the meat does or does not have significant connective tissue or "gristle" or fat.

In addition to the density, width, and thickness of the workpiece, other physical characteristics of the workpiece, including food products, are important factors in the ability to cut the workpiece with a blade-type cutter. Such additional factors include the stiffness, rigidity and internal cohesion, of the workpieces. The stiffness and/or rigidity of the meat food products can be due to rigor mortis of the meat or whether the meat is partially frozen. Also, chicken can have a stiff, unappealing texture known as "woody chicken." These and the other physical characteristics of the workpieces can be highly variable among different products and even within populations of like products. For example, meat products may under some conditions act like liquids and under other conditions act more like a solid or act like some combination of the two expected behaviors. The optimization of the product cutting process recognizes this and seeks to take these factors into consideration, including in determining the cutting speed of a blade cutter.

As discussed above, goals in slicing food products, including meat, with a rotating blade include accurately cutting the portions to a specified weight or weights, or other specification(s). Another goal is to maximize the cut quality of the food product. As mentioned previously, both of these goals can be significantly affected by the speed of the knife blade through the workpiece, and with the desirable speed being impacted by numerous physical characteristics of the workpiece.

The weight of the cut portions 28 can be measured by weighing the portions using a standard weighing machine (not shown) downstream of the cutting device 24. As an alternative, a second scanning system 30 may be utilized to scan the portions 28 and ascertain their weight by determining the volume of the portions 28 and applying an assumed density for the workpiece portions. In lieu of the second scanning system, an x-ray system as discussed above can be used to determine the weight of the cut portions.

Figure 2A:
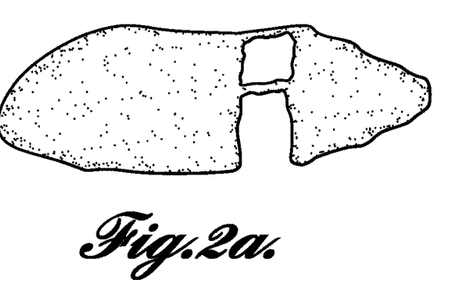
FIG. 2a-FIG. 2e illustrate the quality of cuts applied to portions divided from a workpiece.
Figure 2B:
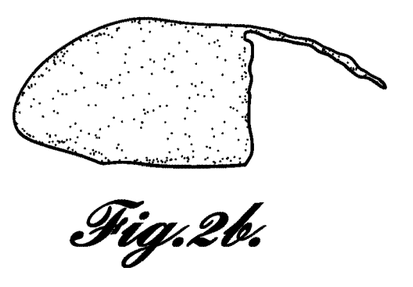
Figure 2C:
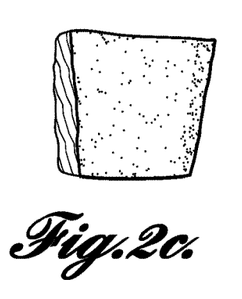
Figure 2D:
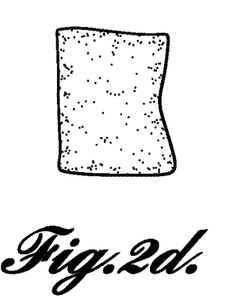
Figure 2E:
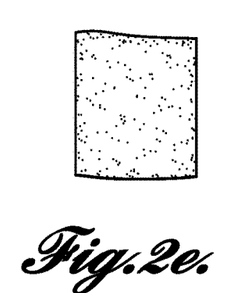

With respect to the quality of the cuts made in the workpiece 14 by blade 22, it is possible to quantify such cut quality by rating the resulting cut using a numerical scale. For example, a value of "1" can be applied to the cut if the cut is incomplete and does not completely sever a portion 26 from an adjacent portion, as shown in FIG. 2a. A rating of "2" could be applied to the cut if the cut is ragged or uneven, or has a trailing string of the workpiece as shown in FIG. 2b. A rating of "3" could be applied if the cut, though the cut is complete, is ragged or "out of square" in two dimensions and/or not flat or even, as shown in FIG. 2c. A higher rating of "4" can be applied to a cut if the cut is "good" but not "perfect" due to being, for example, not vertical or otherwise "square," as shown in FIG. 2d. Lastly, a numerical score of "5" could be applied if the cut is substantially "perfect," meaning "flat with little or no unevenness."

As noted above, the blade 22 of cutting device 24 is driven by a servo motor 26. Servo motors are desirable to use in slicing operations due to their low rotational inertia, high torque levels, and accurate motion (speed) control. At the speeds at which blade 22 is rotated by motor 26, heat buildup in the motor can be very significant due to the very rapid start/stop cycles that are needed to control accurately the rotational profile of the blade 22 and achieve high throughput. A possible avenue to reduce a limit to heat buildup in servo motors is simply to use a larger motor, as will be the case if the blade 22 were driven at a steady state. However, in the present situation, a larger motor would have more inertia, requiring the motor to "work" even harder under the acceleration and deceleration requirements for very rapid start/stop cycles of the blade 22. Thus, the gains achieved by using an increased motor size typically are limited. The result is that servo motor heating can be a significant limitation on the production throughput of rotating blade portioners. Higher cutting velocities and accelerations, with its attendant rapid start/stop cycles, causes increased motor heating for a given throughput. Thus, motor heating is another factor impacting the optimum cutting velocity of the system blade 22.

As noted above, the blade 22 can be rotated at selected velocity profiles about each revolution of the cutting blade. Servo motors currently available are driven by servo-amplifiers, which are quite sophisticated in their ability to achieve ideal or desired waveforms for motion control. Also, data regarding the operational parameters of the motor is available in "real time." For example, it is possible to measure motor current and/or torque generated by the motor when the blade 22 is passing through the workpiece, thereby quantifying the cutting force of the blade in relation to the rotational angle or position of the blade. The same information is available when the blade 22 is not passing through the workpiece.

One goal or beneficial result that can result from optimizing the operational parameters of system 10 is to lower or perhaps even minimize the force required to be applied to the blade 22 to achieve portions of accurate physical specifications as well as high-quality cuts and a desired level of throughput. Also, a lower cutting force provides the advantage of reduced motor heating, thereby lessening the likelihood of damage to the motor and extending the life of the motor.

Monitoring the cutting force of the blade 22 while measuring the motor current or torque generated by the motor 26 enables the sharpness or the dullness of the blade 22 to be ascertained. If the motor current and/or torque generated by the motor 26 is increasing or has increased beyond a predetermined set point, this can be an indication that the blade 22 has dulled sufficiently so that it should be replaced. A record of data indicating how sharp the blade is, can be kept in a data collection system, and computer memory 40, allowing for prediction of the rate the blade will become dull, and the estimated time, or number of future cuts, when the blade will need to be replaced. This ability to monitor the blade enables some strategies for avoiding the problems of a dull blade, and the high expense of unscheduled down time required to change the blade. The cost of unscheduled downtime in modern industrial food plants can in some cases be measured in the hundreds of dollars per minute, but in all cases, most likely is high enough to put a high value on strategies and methods designed to avoid downtime. Two examples of these strategies for this application include (1) avoiding excess wear on the blades by determining the rate the blade is becoming dull, and then switching to products that will require fewer cuts and less wear, or (2) using the method to monitor the wear on the blade, and changing the blade out during scheduled downtime, such as during breaks for workers.

Another indication of the blade 22 becoming dull is increased inaccuracy of the weight of the portions or other physical parameters of the portions. A dull cutting blade 22 can cause the workpiece 14 to move during the cutting of a portion. As a result, all of the subsequent cuts made in the same workpiece may be in the wrong location, and so the weights or other physical parameter of the portions may be inaccurate. Thus, if the weights or other physical specifications of the portions are deviating significantly or are inaccurate, then the sharpness or dullness of the blade 22 should be investigated.

It will be appreciated that the motor current and/or motor torque generated can also be an indication of whether blade 22 has been broken or otherwise damaged. The motor current usage and/or torque generated or broken blades can be stored in the computer 36. Accordingly, if the motor current and/or torque generated matches stored values for broken or damaged blades, then that condition can be identified by the computer 36 and an alert be issued to personnel. Alternatively, the system 10 can be designed so that slicing of the workpieces automatically stops if a broken or damaged blade is detected. In this regard, frozen product can cause the blade 22 to deflect. When it does, in some cases, the blade could hit a part of the machine that breaks or bends the blade. Also, gel workpieces can "stiffen" when cut at high speeds, and thus can break cutting blades. This may also occur in meats.

If a blade becomes twisted along its longitudinal axis or deformed or bent laterally relative to the length of the blade, such broken blades or bent blades can cause damage to parts of the portioning machine, and in particular the plastic conveyor belt. Alarming personnel and/or the emergency stop of the blade would be very useful in preventing damage to the portioning machine and avoiding significant downtime to fix the damage.

Of course, in addition to monitoring the motor current and/or torque, cutting blade damage or failure can be ascertained by changes in the weight or other physical parameters of the portions 28. Also, if the broken or damaged blade results in an incomplete cut between successive portions, then that situation is readily detectable by measuring the weights of the portions 26 or simply visually inspecting the portions.

It will be appreciated that different cutting velocities can be tested, either during normal production or in a separate non-production or calibration mode so as to determine the force imposed on the blade 22 as a function of velocity of the blade passing through the workpiece. This information can be combined with other data, such as the dimensions of a cross-section of the workpiece from scanner 16, or the physical composition of the workpiece (for instance, for the meat workpieces, the amount of fat, gristle, etc., in the meat), thereby to develop parameters of the cutting mode of the blade 22 for specific physical specifications and conditions of the workpiece being processed. In some cases, temperature of the product, especially temperatures in the freezing latent zone, may be encountered, or even encouraged, and could significantly affect the force required, and quality of the cut.

There are numerous possible blade path and speed profiles that can be utilized in controlling and optimizing the operation of system 10. For example, if the cuts made in the workpieces 14 are uniformly spaced, the speed of the blade 22 can be constant or nearly constant, for example, similar to the rotation of an airplane propeller, see FIG. 3A. As a variation, the speed of the blade can be varied (increased or decreased) to match the required timing of the cut, thereby to achieve a desired weight or other physical parameter for the cut portion 26.

Figure 3A:
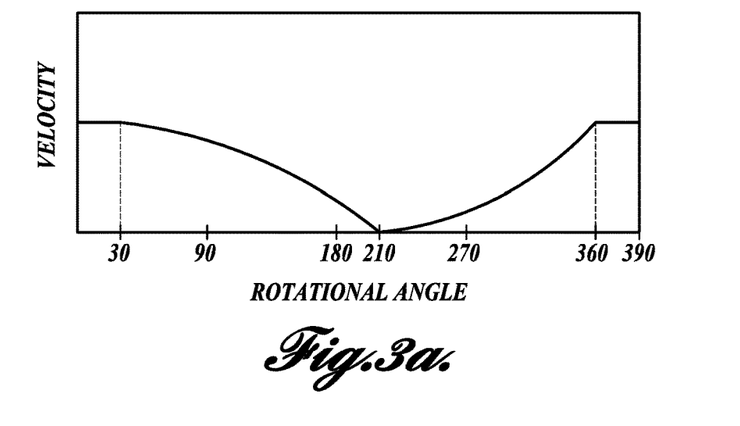
FIG. 3a-FIG. 3e graph possible rotational speeds of a cutting blade along the rotational revolution of the cutting blade.

FIG. 3a plots the speed of the blade 22 about slightly more than the full 360-degree rotation of the blade. In this regard, the blade passes through the workpiece during approximately 30 degrees of the rotation of the blade during each revolution. In FIG. 3a, this corresponds to the rotation of blade 22 from zero degrees to 30 degrees, and then again from 360 degrees to 390 degrees. So, FIG. 3a (as well as FIGS. 3b-3e below) shows the speed of the blade through two cuts of the workpiece.

Figure 3B:
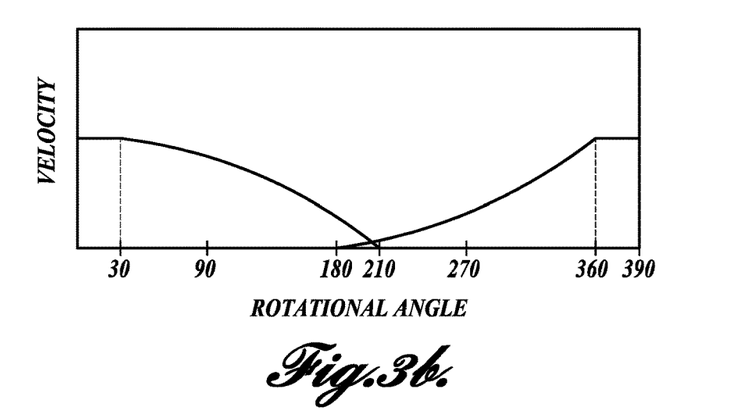

A second approach is to stop the blade between each cut at a point roughly 180 degrees from the center of the workpiece cutting zone, see FIG. 3b. The blade rests at the stop point until it is necessary to move to the next cut, at which time the blade moves at a steady angular acceleration to the cutting zone and then travels through the cutting zone at a steady velocity and thereafter slows to a stop at the stop point via steady deceleration. It will be appreciated that the blade is stopped for only a few milliseconds, since the blade rotates at a speed of 20 to 30 revolutions per second. Nonetheless, depending on the closeness of the cuts and the belt speed, the blade 22 may rest at the stop point for a very short time, or perhaps for a more extended time period.

Figure 3C:
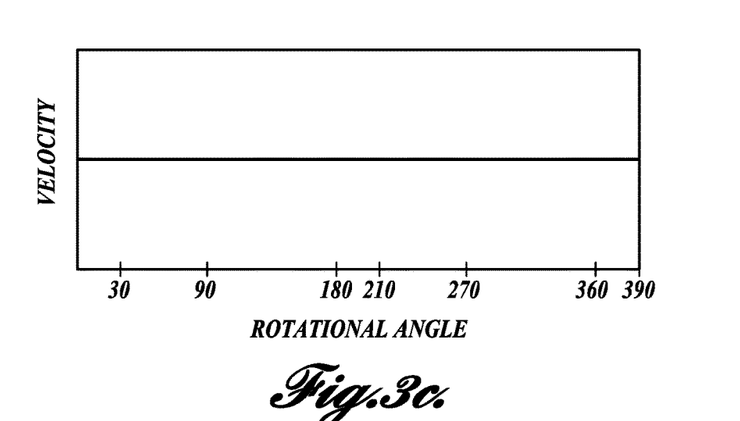
Figure 3D:
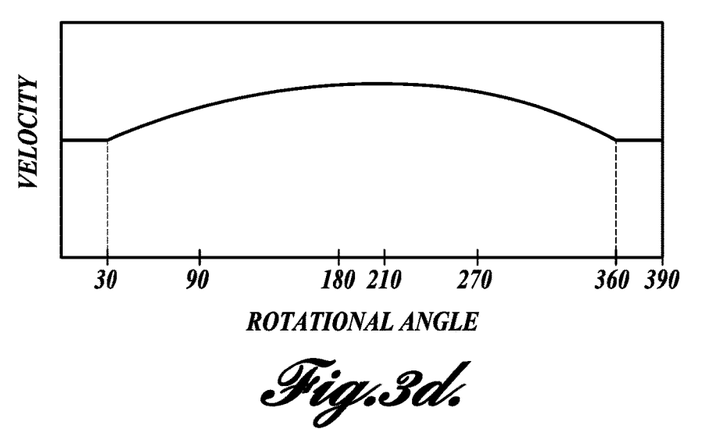
Figure 3E:
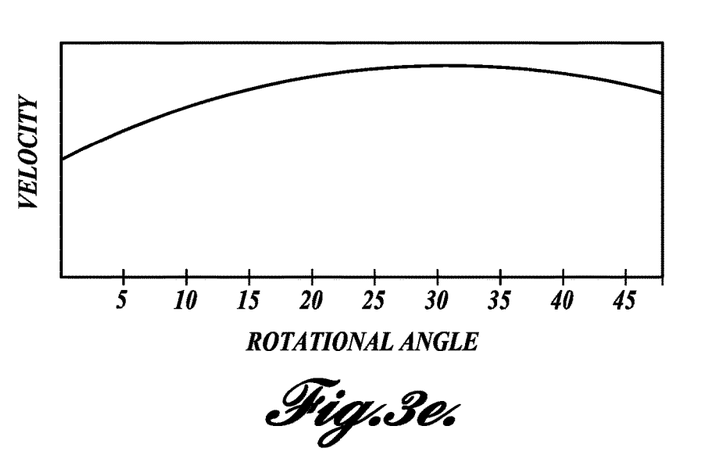

As a third rotational cut profile, shown in FIG. 3c, if there is sufficient time available between cuts and motor heating is a concern, the blade can overshoot the normal stop point and then be retracted to a position before the stop point before the next cut is made. This allows for a more gradual acceleration of the blade to the cut zone. Then, after the blade passes the cut zone, it decelerates more gradually, perhaps overshooting the normal stop point, and then again slowly moving back to a position prior to the normal stop point. This mode of operation helps reduce heating of the motor windings by reducing the required acceleration of the blade 22.

As a fourth potential rotational profile, it may be desirable to have a slower cutting speed, but with a shorter time period between successive cuts. In this rotational speed profile, the blade slows down just before entering the workpiece to be sliced and then speeds up after exiting the workpiece, see FIG. 3d.

In all of the above-described blade speed profiles, the blade speed through the workpiece may be at a constant speed, but this does not necessarily have to be the case. In this regard, allowing the blade to still be accelerating as it enters the workpiece and then allowing the blade to decelerate as it is leaving the workpiece can provide more flexibility to the blade speed profile approaches described above, see FIG. 3e.

Monitoring of motor current and/or motor torque was described above for determining the blade cutting force, which can be an indication of whether the speed of the blade is optimized to the physical parameters or characteristics of the workpieces 14 as well as the condition of the blade 22, including the sharpness or the dullness of the blade and whether the blade has broken or otherwise become damaged. Other motor parameters may be measured or monitored in lieu of the motor current or motor torque. Such other parameters may include, for example, motor following error, which is the extent to or the accuracy with respect to which the motor speed achieves the desired cutting paths and velocity profiles for the blade discussed above. The position and speed of the blade can be readily monitored through the motor drive servo system and errors or irregularities therein can serve as feedback as to the operation of system 10 and the physical parameters, cut quality, and quantity (throughput) of the portions 28. The motor following error, as with motor current or torque, can also provide an indication of the condition of the cutting blade, whether it has become dull, broken or otherwise damaged.

As the condition of the cutting blade changes, for example, as the cutting blade becomes less sharp, the blade path and speed profiles can be altered to compensate for the condition of the blade. For example, as the blade dulls, it may be desirable to reduce the speed of the blade as it passes through the workpiece. As a consequence, the speed of the blade, when not passing through the workpiece, may have to be increased. This blade speed profile may be similar to that shown in FIG. 3d above. Also, it may be desirable for the blade to be accelerating when it enters the workpiece as opposed to traveling through the workpiece at a constant speed. In this regard, see FIG. 3e above.

If the system 10 senses that the motor 26 is overheating with the number of cuts being made, a change may be made to cut products that require fewer cuts. Another option is to alternate between products requiring more or fewer cuts, in order to prevent the motor from overheating.

The desired speed profile of blade 22 can be calibrated including selection of the blade path by performing a calibration procedure for the cutting blade. During such calibration procedure or mode, the blade 22 can be operated at various speeds with the geometry and other specifications of the workpiece stored in computer 36 along with the speed profile of the cutting blade through the workpiece. The motor current profile can be monitored as well as other system parameters, including whether the specified physical parameters of the cut portions (for example, weight) have been achieved, and the quality of the cuts made on the portions. As noted above, some of the geometry data for the workpiece can include its width, thickness, and/or height profile. If the workpiece is meat, additional data can include the type of meat, the extent of marbling or fat, the temperature of the meat, etc. Another consideration is the throughput level achievable at different blade motion and speed profiles.

By the foregoing testing, a blade cutting path can be selected and the blade speed along the rotational blade path determined along with the conveyor belt speed needed to achieve the desired throughput of the workpieces.

Moreover, even during the operational mode of the system 10, occasionally the blade speed can be altered to investigate the resulting system parameters, thereby to determine whether or not the belt speed and cutting profile should be changed to reflect changes that have occurred in the physical parameters of the workpiece, the dulling of the cutting blade, or other factors.

The decision process in determining optimized parameters for cutting workpieces with a blade cutter can be thought of in terms of directly-controlled parameters (and specifications) and indirectly-controlled parameters (and specifications). For example, in algebra, y is said to be a function of x. In other words, y=F(x). The directly-controlled parameters (specifications) are the independent variables such as "x." The indirectly-controlled parameters (specifications) are the dependent variables, such as "y," and result from the input of the directly-controlled parameters (specifications). In the context of the present disclosure, directly-controlled parameters (specifications) represent parameters used to slice the workpiece. Having made cuts (or simulated the cuts) of the workpiece, the resulting portions have properties that constitute the indirectly-controlled parameters along with the throughput of the workpieces and the heat generated in the motor used to power the cutting blade.

In accordance with the present disclosure, it is possible to consider the effect of meeting (or controlling) user-specified directly-controlled parameters (specifications) and other parameters (or specifications) that are not directly controlled, prior to portioning or cutting. Specifically, the present disclosure offers methods that may be used when cutting a workpiece, and it is desired that the resulting portions have particular characteristics not directly controlled by cutting or that a desired throughput is achieved or that a desired operating condition of the cutting motor is achieved.

Examples of directly-controlled parameters and specifications include:
1. The cutting blade path selected;
2. Blade speed throughout the rotational path of the cutting blade;
3. Physical parameter(s) of the cut portions, include weight, thickness, etc.;
4. Conveyor belt speed;
5. Cutting blade type or shape.

Examples of indirectly-controlled parameters and specifications include the following:
1. Physical parameters of portions;
2. Accuracy of the physical parameters of the portions achieved;
3. The quality of the cuts made in the portions;
4. The cutting force profile of the cutting blade as the workpiece is being cut;
5. The motor heat generated;
6. The throughput of the workpieces achieved.

It is to be understood that some of these examples of indirectly-controlled parameters can also be utilized as directly-controlled parameters, such as the physical parameters of the portions.

Figure 4:
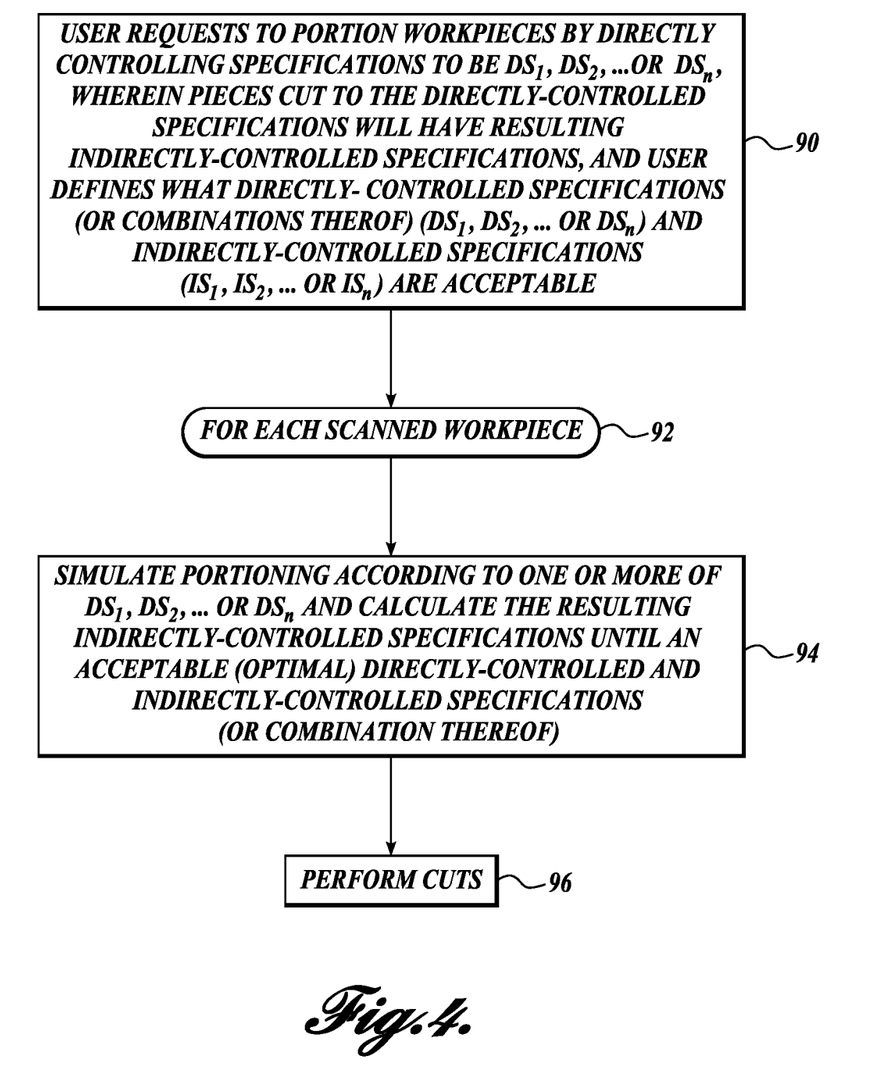
FIG. 4 is a flow chart illustrating a routine for evaluating the effects of cutting to certain specifications on the final product characteristics as well as on the portioning system parameters which are directly controlled by the portioning process, prior to actually portioning the workpiece, according to a further aspect of the present disclosure.

FIG. 4 is a flowchart illustrating a general process of evaluating what effects portioning a workpiece 14 according to certain directly-controlled parameters/specifications will have on the cut portion specifications which are not directly controlled by the portioning process to ensure that the final pieces will have desired physical specifications as well as seeking to minimize motor heating and maximize throughput. In step 90, the user requests to portion workpieces by directly controlling certain parameters, for example, using a specific cutting blade path and controlling the speed of the cutting blade throughout the select path. Further, the user requests that workpieces cut to the selected specification(s) result in desired indirectly-controlled characteristics, for example, the weight or thickness of the portions and the quality of the cuts made on the resulting portions. Other directly-controlled parameters and specifications may include physical specifications of the cut portions, the speed of the conveyor belt, as well as the type of cutting blade used. These directly-controlled characteristics, as well as those noted above, will have a bearing on several possible indirectly-controlled parameters and specifications, including the accuracy of the physical parameters of the portions cut from the workpieces, the quality of the cuts made in the portions, the cutting force required to cut the workpieces into desired portions, the level of motor heat generated, and the throughput of the workpieces achieved.

Thereafter, for each scanned workpiece (block 92), in block 94, portioning the workpiece according to one or more directly-controlled specification(s) ($DS_1$, $DS_2$ . . . or $DS_N$) is simulated, and resulting indirectly-controlled specification(s) is calculated. For example, cutting according to the specification $DS_1$ (e.g., blade speed) is simulated and the indirectly-controlled specification $IS_1$ (e.g., throughput) resulting from the cutting to the specification $DS_1$ is calculated. If an acceptable value or level of $IS_1$ (throughput) results, then portioning of the workpiece will commence.

Of course, rather than simulating portioning based on a singular directly-controlled parameter specification, simulation may be carried out using several of the possible directly-controlled parameters and several resulting indirectly-controlled parameters may be calculated. If an acceptable combination of directly-controlled parameters of $DS_1$, $DS_2$ . . . or $DS_N$ and indirectly-controlled parameters of $IS_1$, $IS_2$ . . . or $IS_N$ is found, then portioning can be carried out in accordance with the selected directly-controlled parameters. Further, one or more of the directly-controlled parameters $DS_1$, $DS_2$ . . . or $DS_N$ can be varied until an acceptable combination of indirectly-controlled parameters $IS_1$, $IS_2$ . . . or $IS_N$ results. It is possible to continue the simulation and calculation process with different directly-controlled parameters until an acceptable combination of indirectly-controlled parameters is achieved.

Alternatively, a value function (or its negative/opposite, or cost function) may be used to rank multiple alternative solutions. According to this methodology, portioning to multiple specification requirements ($DS_1$, $DS_2$ . . . or $DS_N$ in this example) is simulated, and the resulting indirectly-controlled specification(s) ($IS_1$, $IS_2$ . . . $ISn$), for example, accuracy of portion weight, level of motor heat generated, etc., is calculated for each simulation and compared to the acceptable indirectly-controlled specification(s) or $IS_N$). If multiple acceptable combinations of directly-controlled parameters exist, a suitable value function is used to select the most preferable combination.

After the acceptable optimal combinations of $DS_1$, $DS_2$ . . . or $DS_N$ and $IS_1$, $IS_2$ . . . or $IS_N$ is found, then, proceeding to Step 96 as shown in FIG. 4, the portioning system 10 is used to perform actual cuts of the workpiece in accordance with the selected combination of directly-controlled and indirectly-controlled specifications.

As a further aspect of the present disclosure, each of the characteristics, i.e., parameters/specifications, both direct and indirect, can potentially have an acceptable range rather than just a single acceptable value. It is possible to define a "cost" function that has a value of 0 (zero) at the center of each range of each specification with an increasing "cost" as the simulated values of the parameters deviate from the center of the specification range. Further, a weighting factor can be applied to the "cost" from each of the parameters. Finally, the "weighted" costs are combined, such as by addition, to give a "total cost." Thus, for each combination of the directly-controlled characteristics and resulting indirectly-controlled characteristics, there is a single "total cost" amount associated with the simulated cutting/portioning result. It is to be understood that the term "cost" as used herein refers to the negative or opposite to the word "value" discussed above. These terms are related in the sense that with respect to a particular specification, an increase in the "cost" corresponds to a decrease in the "value."

The cost function definition could take almost any form, including one-sided definitions, where the characteristic can never be above or below a threshold, and the target (0 cost) value is something other than the middle of the range. An example of this exists from packaged grocery goods where it is legally required that a container not contain less than the labeled amount or quantity. However, it is clearly in the interest of the product producer to be as close as possible to the labeled amount or quantity.

Examples of three cost functions that can be used include:

1. The cost increases with deviation from the range midpoint, and continues increasing for parameter values beyond the range;

2. The cost increases from a deviation from the range midpoint, with "hard" limits (for example, large step function cost increase) at the range limits;

3. There is no cost associated with values within the range, with "hard" limits at the range limits.

The "total cost" number is used with a multi-dimensional optimization technique, such as the "Gradient Descent" minimization algorithm, to find an optimal choice of directly-controlled parameters/specifications. Within a limited number of steps or iterations, it is possible to find the optimal solution without having to consider all of the perhaps thousands of potential combinations of directly-controlled parameter values. Examples of non-linear algorithms similar to Gradient Descent include the Gauss-Newton method, the BFGS method, and the Levenberg-Marquardt method. Other algorithms or analysis methods that may be utilized in this regard include, for example Nelder-Mead method, differential evolutions methods, genetic algorithms, particle swarm optimization, as well as binary digital methods. Of course, in the range of interest, linear algorithms and analysis techniques can be used to arrive at an optimum choice of directly-controlled parameters.

It is to be understood that in the above description of identifying optimum directly-controlled and/or indirectly-controlled parameters and specifications, a cost function analysis can be utilized. However, it is also to be understood that the negative or opposite concept of a value function could be employed instead. In this case, a multi-dimensional maximization technique or algorithm would be applied to arrive at optimal directly- and/or indirectly-controlled parameters/specifications.

Figure 5:
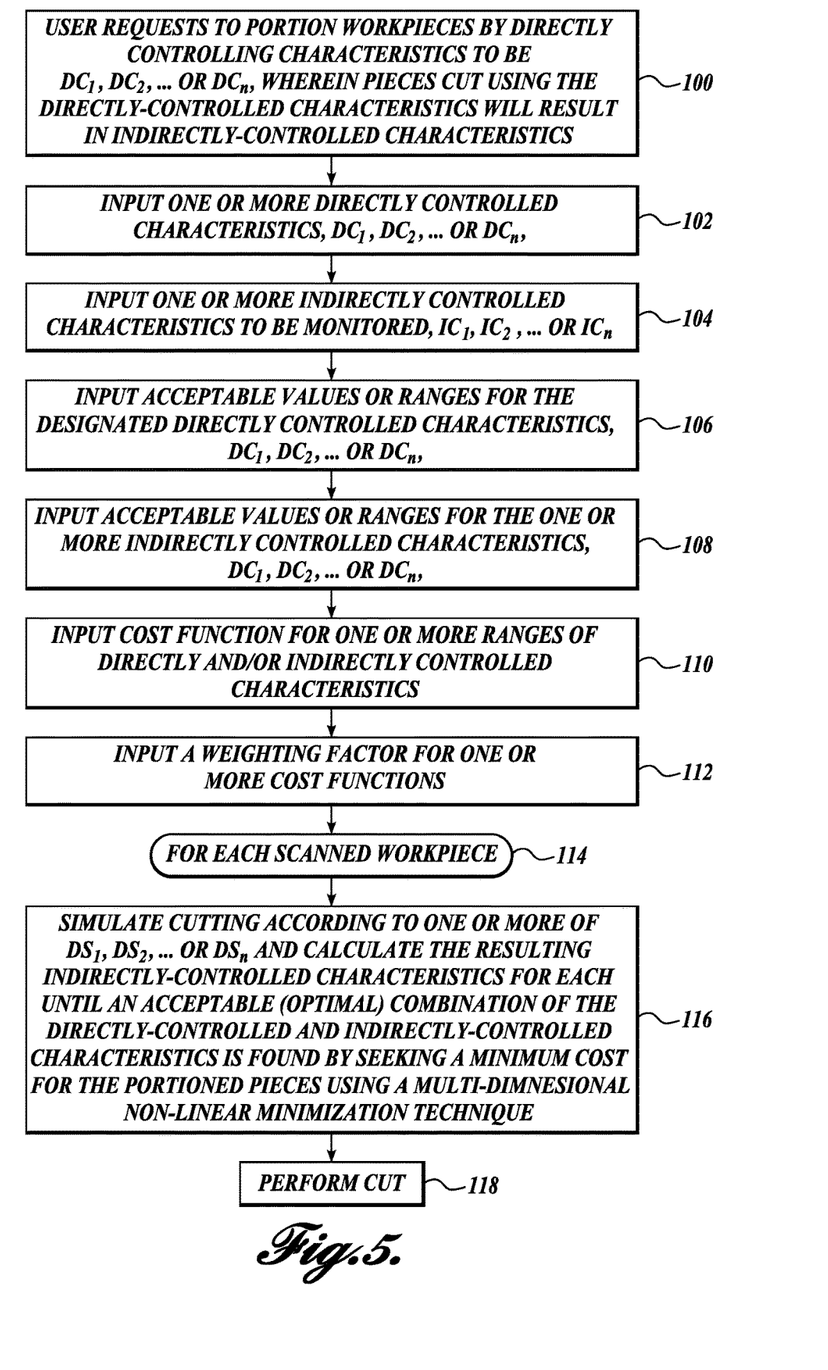
FIG. 5 is a flow diagram illustrating a routine for evaluating the effects on indirectly-controlled parameters or specifications of a workpiece or portioning system based on selected directly-controlled parameters or specifications prior to actually portioning the workpiece, according to a further aspect of the present disclosure.

FIG. 5 is a flow chart illustrating one example of a process or method for determining how to cut a workpiece according to one or more directly-controlled characteristics (parameters or specifications) to achieve desired one or more indirectly-controlled characteristics (parameters or specifications) of the resulting portioned piece.

In step 100, a user requests to cut the workpieces by directly controlling certain characteristics (parameters or specifications) $DC_1$, $DC_2$ ... $DC_n$, for example, cutter blade path, cutter blade speed throughout the rotational path of the cutter blade, and/or conveyor speed.

In the process, in step 102, the user inputs one or more directly-controlled characteristics $DC_1$, $DC_2$, ... $DC_n$.

Next at step 104, the user inputs one or more resulting indirectly-controlled characteristics (parameters or specifications) to be met by the portions that meet the characteristic requirements of $DC_1$, $DC_2$, ... and/or $DC_n$.

Next at step 106, the user inputs acceptable ranges of values for the directly-controlled characteristics (parameters or specifications) $DC_1$, $DC_2$, ... and/or $DC_n$. This can be performed using a graphical user interface, for example, interface 38 shown in FIG. 1. This example varies from the example described above in that in the present example, specification ranges are specified by the parameter being utilized. Nonetheless, it is to be understood that a specific value can be specified for one or more of the parameters being utilized.

Next at step 108, acceptable values or ranges for the one or more indirectly-controlled characteristics (parameters or specifications) are inputted.

Next at step 110, cost functions can be assigned to one or more of the directly-controlled and/or indirectly-controlled characteristics (parameters or specifications). As discussed above, the cost function can have a value of zero at the center of the range of each specification, with an increasing cost as the simulated value of the parameter in question deviates from the center of the specification range. Also, as discussed above, the cost function definition can take many other forms, including one-sided "definitions" where parameters can never be above or below a threshold value, and the target (zero cost) value is other than at the middle of a range.

Next at step 112, a weighting factor can be assigned to one or more of the costs of a parameter, thereby to establish that some cost factors are more important or less important than other cost factors.

Then for the scanned workpiece (block 114), in block 116, simulating the cutting of the workpiece occurs according to the one or more directly-controlled characteristics (parameters or specifications) ($DC_1$, $DC_2$, ... and/or $DC_n$), and the resulting indirectly-controlled characteristics (parameters or specifications) are calculated or determined using computer 36. For example, cutting according to characteristic $DC_1$ is simulated and the indirectly-controlled parameter (e.g., weight, throughput) resulting from the cutting to the characteristic $DC_1$ is calculated. This may be carried out by seeking to minimize the "total cost" of the resulting portion using a multi-dimensional minimization technique. In this manner, a minimum cost or an acceptable cost can be achieved, typically after a discrete number of calculation iterations. This eliminates the need to perform calculations for every possible acceptable directly-controlled characteristic(s) $DC_1$, $DC_2$, ... and/or $DC_n$.

After an acceptable and/or optimal combination of directly-controlled parameters and specifications and/or indirectly-controlled parameters and specifications is arrived at, then, at step 118, the portioning system is used to perform cutting according to the selected combination for the directly-controlled and indirectly-controlled parameter(s)/specification(s).

While illustrative embodiments have been illustrated and described, it will be appreciated that various changes can be made therein without departing from the spirit and scope of the invention. In this regard, although the present disclosure has mentioned specific food items, the methods and systems of the present disclosure are not limited to the specific food items mentioned, but can be used to portion other types of food items, including, for instance, fruits and vegetables, and other types of meat, poultry, or fish. Further, the present disclosure is applicable to non-food workpieces of numerous types.

Further, a programmable logic controller could be used in place of computer 36 and its attendant components. As a further alternative, rather than employing a computer 36 specifically for the portioning system 10, the portioning system can be connected to a network computing system employed to control other operations in addition to portioning system 10, for example, cooking systems, freezing systems, packaging systems, etc.

In addition, although blade 22 is illustrated in FIG. 1 as being in a straight profile, the blade instead could be formed in other profiles, such as curved. A curved blade would allow the cutting edge of the blade to both slide along the workpiece as well as penetrate into the workpiece. This could assist in performing the cutting of various types of workpieces.

Also, the cutting device 24 can be of types other than the cutting device 24 illustrated and described above. For example, the cutting device may be a motor-driven circular saw, a radial saw, a band saw, a hacksaw, a reciprocating saw, a Stryker® saw, etc. All of these cutting devices are motor-driven, wherein the operational parameters of the motor may be an important factor in optimizing the cutting speed of the cutting device. These alternative cutting devices can have cutting edges of various profiles or configurations, including a tooth cutting edge.

The embodiments of the invention in which an exclusive property or privilege is claimed are defined as follows:

1. A method for determining optimized parameters for cutting a workpiece with a blade cutter, the blade cutter rotated by a motor, said method comprising:
   monitoring the rotational speed profile of the blade cutter about the revolution of the blade cutter by the motor;
   monitoring data from the motor corresponding to operational parameters of the motor during rotation of the blade cutter;
   monitoring the accuracy of desired physical specifications of the portions being cut;
   monitoring the feed rate of the workpieces relative to the blade cutter;
   optimizing at least one of the speed profile of the blade cutter during the revolution of the blade cutter and the feed rate of the workpieces, based on the one or more desired operational parameters of the motor and the desired accuracy of the one or more physical specifications of the portions being cut.

2. The method of claim 1, wherein the operational parameters of the motor include at least one of the motor current usage profile, temperature of the motor, motor following error, and motor torque profile.

3. The method of claim 1, wherein the physical specifications of the portions being cut comprise the weight of the portions cut from the workpiece, the mass of the portions cut from the workpiece, the thickness of the portions cut from the workpiece, and the quality of the cuts made on the portions.

4. The method according to claim 3, further comprising quantifying the quality of the cuts made on the portions.

5. The method of claim 4, wherein the quality of the cuts made in the portions is quantified according to a numerical scale.

6. The method according to claim 1, wherein the motor rotational speed profiles include:
   (a) stopping the rotation of the blade cutter between each cut made and then accelerating the blade cutter at the required time to make a cut;
   (b) overshooting the normal rotational stop point of the blade cutter and retracting the blade cutter to a rotational position before the stop point at a time before the next cut is to be made;
   (c) rotating the blade cutter at a substantially constant speed;
   (d) rotating the blade cutter at an overspeed through the non-cutting rotational travel of the blade cutter and slowing the rotation of the blade cutter as the blade cutter cuts through the workpiece;
   (e) rotating the blade cutter at a constant speed through the workpiece; and
   (f) rotating the blade cutter at a non-constant speed through the workpiece.

7. The method of claim 1, further comprising monitoring the throughput of the workpieces and optimizing at least one of the speed profile of the blade cutter and the feed rate of the workpieces based on the desired operational parameters of the motor and the desired accuracy of the physical specifications of the portions being cut.

8. In a system for cutting food items into portions with a cutting blade rotated by a motor about a rotational path profile, a method for adjusting the operational parameters of the system comprising the rotational speed profile of the cutting blade and/or the feed rate of the food items relative to the cutting blade based on at least one of the desired physical characteristics of the portions to be cut from the food items and the desired throughput of the food items to be achieved, and the desired operational parameters of the system comprising:
   determining an initial first set of operational system parameters, including the rotational speed profile of the cutting blade and the feed rate of the food items toward the cutting blade;
   monitoring the operational parameters of the motor during rotation of the cutting blade;
   monitoring the physical characteristics of the portion being cut;
   monitoring the throughput of the food items;
   adjusting the rotational speed of the cutting blade and/or the feed rate of the food item based on at least one of the monitored operational parameters of the motor, the physical accuracy of the portions being cut and the feed rate of the food items.

9. The method of claim 8, wherein the physical characteristics of the portions being cut comprise weight, mass, thickness, area, and cut quality.

10. The method according to claim 8, wherein the operational parameters of the motor include current profile, torque profile, and motor following error.

11. The method according to claim 8, wherein the motor rotational path profiles are selected from the group consisting of:
   (a) stopping the rotation of the cutting blade between each cut made and then accelerating the cutting blade at the required time to make the next cut;
   (b) overshooting the normal rotational stop point of the cutting blade and retracting the cutting blade to a rotational position before the stop point at a time before the next cut is required to be made;
   (c) rotating the cutting blade at substantially a constant speed;
   (d) rotating the cutting blade at an overspeed through the non-cutting rotational travel of the cutting blade and slowing the rotation of the cutting blade as the cutting blade cuts through the workpiece;
   (e) rotating the cutting blade at a substantially constant speed through the workpiece; and
   (f) rotating the cutting blade at a non-constant speed through the workpiece.

12. A method of adaptive control of operational parameters of a blade slicing machine to slice workpieces into portions with a cutter rotated by a motor along a rotational speed profile, comprising:
   selecting a first set of cutting parameters;
   performing the slicing of the workpieces using the first set of selected cutting parameters;
   during the slicing of the workpieces, measuring the operational parameters of the motor;
   varying at least one of the cutting parameters and comparing successive measurements of the operational parameters of the motor;
   determining the throughput at the selected operational parameters; and
   setting the cutting parameters of the slicing machine based on the measured operational parameters of the motor and the desired throughput.

13. The method according to claim 12, wherein the cutting parameters comprise the rotational speed of the cutter and the feed rate of the workpieces.

14. The method according to claim 13, wherein the motor rotational speed profiles are selected from the group consisting of:
   (a) stopping the rotation of the cutter between each cut made and then accelerating the cutter at the required time to make a cut;
   (b) overshooting the normal rotational stop point of the cutter and retracting the cutter to a rotational position before the stop point at a time before the next cut is required to be made;
   (c) rotating the cutter at substantially a constant speed;
   (d) rotating the cutter at an overspeed through the non-cutting rotational travel of the cutter and slowing the rotation of the cutter as the cutter cuts through the workpiece;
   (e) rotating the cutter at a substantially constant speed through the workpiece; and
   (f) rotating the cutter at a non-constant speed through the workpiece.

15. The method according to claim 12, wherein the cutting parameters are selected from the group consisting of at least one of the physical specifications of the portions cut from the workpiece and the quality of the cuts made to the workpiece.

16. The method according to claim 15, wherein the physical characteristics of the portions cut from the workpiece are selected from the group consisting of weight, thickness, area, and cut quality.

17. The method according to claim 12, wherein the operational parameters of the motor include one or more parameters selected from the group including motor rotational speed, motor rotational speed profile, current use usage profile during each motor revolution, temperature of the motor, motor following error, and torque profile during each motor revolution.

18. The method according to claim 12, wherein the cutting parameters comprise the type of cutter utilized.

19. The method according to claim 18, wherein the type of cutter is selected from the group consisting of: a cutter having a cutting blade with a substantially straight cutting edge, a cutter having a cutting blade h with a curved cutting edge; and a cutter having a cutting blade with a toothed cutting edge.

\* \* \* \* \*